(12) United States Patent
Cho et al.

(10) Patent No.: US 8,444,883 B2
(45) Date of Patent: May 21, 2013

(54) METHOD FOR PREPARING CATHODE ACTIVE MATERIAL FOR LITHIUM SECONDARY BATTERY

(75) Inventors: Jaephil Cho, Yongin-si (KR); Junho Eom, Pohang-si (KR); Yoon Han Chang, Hwaseong-si (KR); Chang-Won Park, Suwon-si (KR); Seung-Won Lee, Seoul (KR); Sang-Hoon Jeon, Daegu (KR); Byung Do Park, Ulsan (KR)

(73) Assignee: L & F Co., Ltd., Daegu (KR)

( * ) Notice: Subject to any disclaimer, the term of this patent is extended or adjusted under 35 U.S.C. 154(b) by 259 days.

(21) Appl. No.: 12/933,629

(22) PCT Filed: Mar. 24, 2009

(86) PCT No.: PCT/KR2009/001493
§ 371 (c)(1),
(2), (4) Date: Oct. 29, 2010

(87) PCT Pub. No.: WO2009/120008
PCT Pub. Date: Oct. 1, 2009

(65) Prior Publication Data
US 2011/0042610 A1    Feb. 24, 2011

(30) Foreign Application Priority Data
Mar. 24, 2008    (KR) .................. 10-2008-0026923

(51) Int. Cl.
*H01M 4/36*    (2006.01)

(52) U.S. Cl.
USPC ..................... 252/520.2; 423/69; 423/179

(58) Field of Classification Search
USPC ............... 252/182.1, 520.2; 429/122; 423/69, 423/179
See application file for complete search history.

(56) References Cited

U.S. PATENT DOCUMENTS 6,998,071 B2 *   2/2006   Maeda et al. ............. 252/521.2
7,011,907 B2 *   3/2006   Noguchi et al. ............. 429/223

FOREIGN PATENT DOCUMENTS

| JP | 2008-016235 | * | 1/2008 |
| KR | 10-2002-0043652 | | 6/2002 |
| KR | 10-2007-0104215 | | 10/2007 |
| KR | 10-0819741 | | 12/2007 |

* cited by examiner

*Primary Examiner* — Mark Kopec
*Assistant Examiner* — William Young
(74) *Attorney, Agent, or Firm* — Lexyoume IP Meister, PLLC.

(57) ABSTRACT

A method for preparing a cathode active material for a lithium secondary battery is provided. The preparing method includes: adding a phosphorus compound to a transition metal oxide dispersion liquid to prepare a coating liquid; drying the coating liquid to prepare a powder including phosphorus oxide coated on the surface of the transition metal oxide; and dry-mixing the powder coated with the phosphorus oxide with a lithium intercalation compound, and then firing the mixture to form a solid solution compound of $L_1$-$M_1$-$M_2$-P—O (where $M_1$ is a transition metal derived from transition metal oxide, and $M_2$ is a metal derived from lithium intercalation compound) on the surface of the lithium intercalation compound. The method for preparing a cathode active material for a lithium secondary battery simplifies the conventional preparing process to save process cost, and it provides comparable electrochemical characteristics to a cathode active material obtained from a wet process.

10 Claims, 7 Drawing Sheets

TiKa1

FIG.6

PKa1

TiKa1

FIG.9

PKa1

TiKa1

US 8,444,883 B2

METHOD FOR PREPARING CATHODE ACTIVE MATERIAL FOR LITHIUM SECONDARY BATTERY

TECHNICAL FIELD

The present invention relates to a method for preparing a cathode active material of a lithium secondary battery. More particularly, the present invention relates to a method for preparing a cathode active material of a lithium secondary battery being capable of reducing process costs.

BACKGROUND ART

Lithium secondary batteries use materials capable of reversibly intercalating or deintercalating lithium ions in cathode and anode, and include an organic electrolyte solution or a polymer electrolyte for transfer of lithium ions between the cathode and anode. Lithium secondary batteries generate electrical energy by an oxidation/reduction reaction during the intercalation/deintercalation of lithium ions at the cathode and anode.

For a cathode active material of a lithium secondary battery, metal chalcogenide compounds being capable of intercalating and deintercalating lithium ions are generally used. Examples of the compounds include commercialized composite metal oxides including a cobalt-based compound such as $LiCoO_2$, and the like, a manganese-based compound such as $LiMn_2O_4$, $LiMnO_2$, and the like, and a nickel-based compound such as $LiNiO_2$, $LiNi_{1-x}Co_xO_2$ ($0<x<1$), and the like.

Generally, the cathode active material is prepared according to a solid-phase synthesis method or a wet synthesis method. When it is prepared according to the solid-phase synthesis method, a starting material for synthesizing the cathode active material and secondary phases produced at a low temperature may be maintained at a high temperature, so that it is difficult to control the uniformity of particle size and dispersion when the starting material has a large particle size. In order to solve the problems and to provide a cathode active material such as a single phase $LiMn_2O_4$ powder, it may be prepared according to the low temperature synthesis method.

The method of synthesizing a cathode active material at a low temperature generally uses a wet method. The wet method may include a sol-gel method, precipitation, a Pechini process, a hydrothermal process, an emulsion-drying method, a melt-impregnation method, a combustion method, a citric acid method, and the like. The wet method may synthesize a cathode active material such as a single phase $LiMn_2O_4$ powder having excellent crystallinity, homogeneity, and uniform shape distribution of a micron or less, but the methods have many problems of cost, time, and a complicated process.

DISCLOSURE

Technical Problem

One purpose of the present invention is to provide a method for preparing a cathode active material for a lithium secondary battery that simplifies the process for preparing a cathode active material and saves the process cost compared to the conventional method, and to provide electrochemical characteristics comparable to those obtained by the wet process.

The embodiments of the present invention are not limited to the above technical purposes, and a person of ordinary skill in the art can understand other technical purposes.

Technical Solution

In order to realize the purpose, one embodiment of the present invention provides a method for preparing a cathode active material for a lithium secondary battery that includes adding a phosphorus compound to a transition metal oxide dispersed in a liquid to prepare a coating liquid; drying the coating liquid to prepare a powder including phosphorus oxide coated on the surface of the transition metal oxide; and dry-mixing the powder coated with the phosphorus oxide with a lithium intercalation compound, and then firing the mixture to form a solid solution compound of $Li-M_1-M_2-P-O$ (where $M_1$ is a transition metal derived from transition metal oxide, and $M_2$ is a metal derived from lithium intercalation compound) on the surface of the lithium intercalation compound.

Another embodiment of the present invention will be described in detail.

Advantageous Effects

According to the present invention, the process for preparing a cathode active material for a lithium secondary battery may be simplified and the process cost compared to the conventional preparing process may be remarkably reduced, and it may also provide comparable electrochemical characteristics to those of a cathode active material obtained by a wet process.

BEST MODE

Exemplary embodiments of the present invention will hereinafter be described in detail. However, these embodiments are only exemplary, and the present invention is not limited thereto.

The method for preparing a cathode active material for a lithium secondary battery according to one embodiment includes: adding a phosphorus compound to a transition metal oxide dispersion liquid to prepare a coating liquid (S1); drying the coating liquid to prepare a powder including phosphorus oxide coated on the surface of the transition metal oxide (S2); and dry-mixing the powder coated with the phosphorus oxide with a lithium intercalation compound, and firing the mixture to form a solid solution compound of Li-$M_1$-$M_2$-P—O (where $M_1$ is a transition metal derived from transition metal oxide, and $M_2$ is a metal derived from lithium intercalation compound) on the surface of the lithium intercalation compound (S3).

First, a phosphorus compound is added to a transition metal oxide dispersion liquid to prepare a coating liquid (S1).

The phosphorus compound includes a phosphate, a phosphonate, a phosphinate, or phosphoric acid ($H_3PO_4$), but is not limited thereto. The phosphate, phosphonate, and phosphinate may be a phosphate, a phosphonate, and a phosphinate of a cation selected from the group consisting of ammonium, an alkaline metal, an alkaline-earth metal, and a combination thereof. More specific examples include one selected from the group consisting of $NH_4H_2PO_4$, $(NH_4)_2HPO_4$, $Na_5P_3O_{10}$, $Na_3P_3O_9$, $NaH_2PO_4$, $Li_5P_3O_{10}$, $Li_3P_3O_9$, $LiH_2PO_4$, and a combination thereof, but are not limited thereto.

The transition metal oxide may have an average particle diameter of a nano-size that ranges from several nm to several hundred nm. For example, the transition metal oxide may have an average particle diameter of 80 to 900 nm, preferably, 80 to 700 nm, more preferably, 80 to 500 nm, and further preferably 80 to 120 nm. When the transition metal oxide has the average particle diameter within the range, it may be not agglomerated during coating of the active material, so as to provide a uniform dispersion.

The transition metal oxide is preferably represented by the following Chemical Formula 1.

$$M_1O_x \quad \text{[Chemical Formula 1]}$$

wherein, $M_1$ is one selected from the group consisting of Co, Mn, Mg, Fe, Ni, Al, Ti, and a combination thereof, and $0<x\leq 2$.

The dispersion liquid of the transition metal oxide is prepared by dispersing the transition metal oxide in a solvent. The solvent may include a commonly-used organic solvent, but is not limited thereto. For example, it may include an alcohol such as methanol, ethanol, or isopropanol, or hexane, chloroform, tetrahydrofuran, ether, methylene fluoride, acetone, water, and so on.

The transition metal oxide is added at 0.1 to 2 parts by weight, and preferably 0.5 to 1 parts by weight based on 100 parts by weight of the lithium intercalation compound. When the transition metal oxide is added within the range, it may provide a powder having excellent cycle life and rate capability of a cathode active material.

The order of adding the transition metal oxide and the phosphorus compound into the solvent is not specifically defined. After adding the transition metal oxide into the solvent to provide a transition metal oxide dispersion liquid, the phosphorus compound may be added into the transition metal oxide dispersion liquid to provide a coating liquid; or the transition metal oxide and the phosphorus compound may be simultaneously added into the solvent to provide a coating liquid.

An agitation process may be further performed while the coating liquid is prepared. The agitation process may be performed for 5 minutes to 1 hour.

The obtained coating liquid is dried to provide a powder of which phosphorus oxide is coated on the surface of the transition metal oxide (S2).

The drying process is performed at a temperature of 80 to 200° C., or for example, 80 to 120° C., or 90 to 100° C. In addition, the drying process is performed for 8 to 12 hours, preferably 8 to 10 hours. When the drying process is performed under the condition, it may completely dry the powder coated with the phosphorus oxide.

Subsequently, the powder coated with the phosphorus oxide is dry-mixed with a lithium intercalation compound, and then the mixture is fired to provide a solid solution compound of Li-$M_1$-$M_2$-P—O (where $M_1$ is a transition metal derived from transition metal oxide, and $M_2$ is a metal derived from lithium intercalation compound) on the surface of the lithium intercalation compound (S3).

The lithium intercalation compound is not specifically defined in this specification, and it may include a lithium composite metal oxide or a lithium chalcogenide compound. The lithium composite metal oxide is represented by the following Chemical Formula 2.

$$LiNi_{1-x-y}Co_xM_{2y}O_{2y'} \quad \text{[Chemical Formula 2]}$$

In Chemical Formula 2, $M_2$ is one selected from the group consisting of Co, Mn, Mg, Fe, Ni, Al, and a combination thereof, $0 \leq x \leq 1$, and $0 \leq y \leq 1$, and $0 \leq x+y \leq 1$.

The lithium intercalation compound may have an average particle diameter of 10 to 30 μm, or for example, an average particle diameter of 15 to 20 μm. When the lithium intercalation compound has the average particle diameter within the range, the transition metal oxide is uniformly coated.

The powder coated with the phosphorus oxide is mixed with the lithium intercalation compound in a weight ratio of 0.02:98.8 to 2:98, or for example, a weight ratio of 0.3:98.7 to 1:99. When the powder coated with phosphorus oxide is mixed with the lithium intercalation compound within the range, it may enhance the cycle-life and rate capability of a cathode active material.

The dry-mixing process is widely known in this field of the present invention, so the detailed description is omitted.

The firing process is performed at a temperature ranging from 700 to 1200° C., or for example, from 800 to 1050° C. In addition, the firing process is performed for 8 to 12 hours, or for example, for 8 to 10 hours. When the firing process is performed under the condition, it may enhance the cycle life and rate capacity of a cathode active material and prevent decomposition of $LiCoO_2$.

When the cathode active material for a lithium secondary battery is prepared according to the method of the present invention, the method is remarkably simplified compared to the conventional wet method for providing a cathode active material, so 50% or more of the process cost may be saved. In addition, the obtained cathode active material has comparable electrochemical characteristics to the cathode active material obtained by the conventional wet method.

Figure 1:
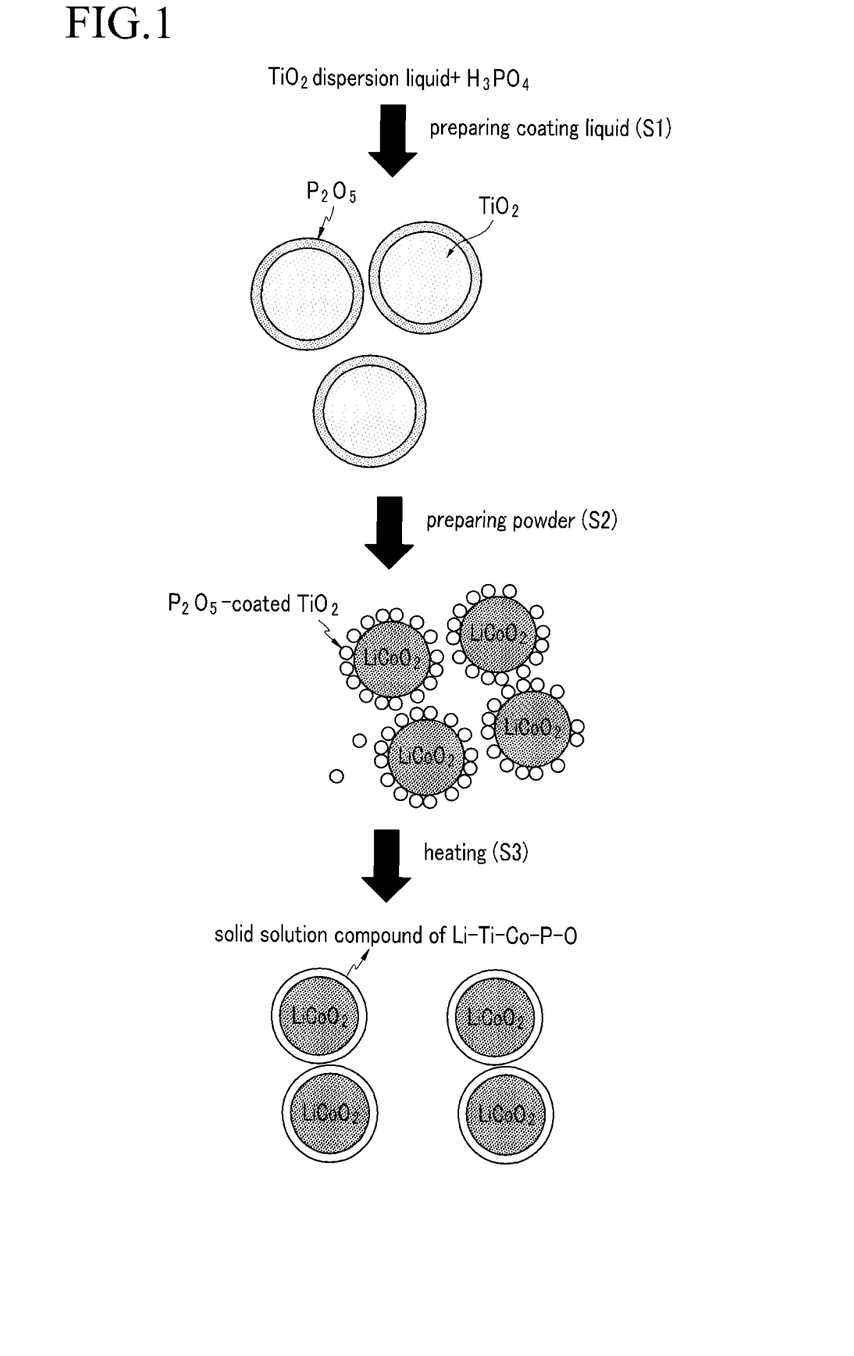
FIG. 1 is a schematic view showing the method for preparing a cathode active material for a lithium secondary battery according to one embodiment.

FIG. 1 is a schematic view showing a method for preparing a cathode active material for a lithium secondary battery according to one embodiment. In FIG. 1, $TiO_2$ is exemplified as a transition metal oxide, and $TiO_2$ and $H_3PO_4$ are uniformly dispersed in a solvent to provide a coating liquid and dried to provide a powder of which phosphorus oxide ($P_2O_5$) is coated on the surface of the transition metal oxide. The powder coated with phosphorus oxide is dry-mixed with the lithium intercalation compound and fired to provide a Li—Ti—$M_2$-P—O (wherein $M_2$ is derived from the lithium intercalation compound) solid solution compound on the surface of the lithium intercalation compound.

Figure 2:
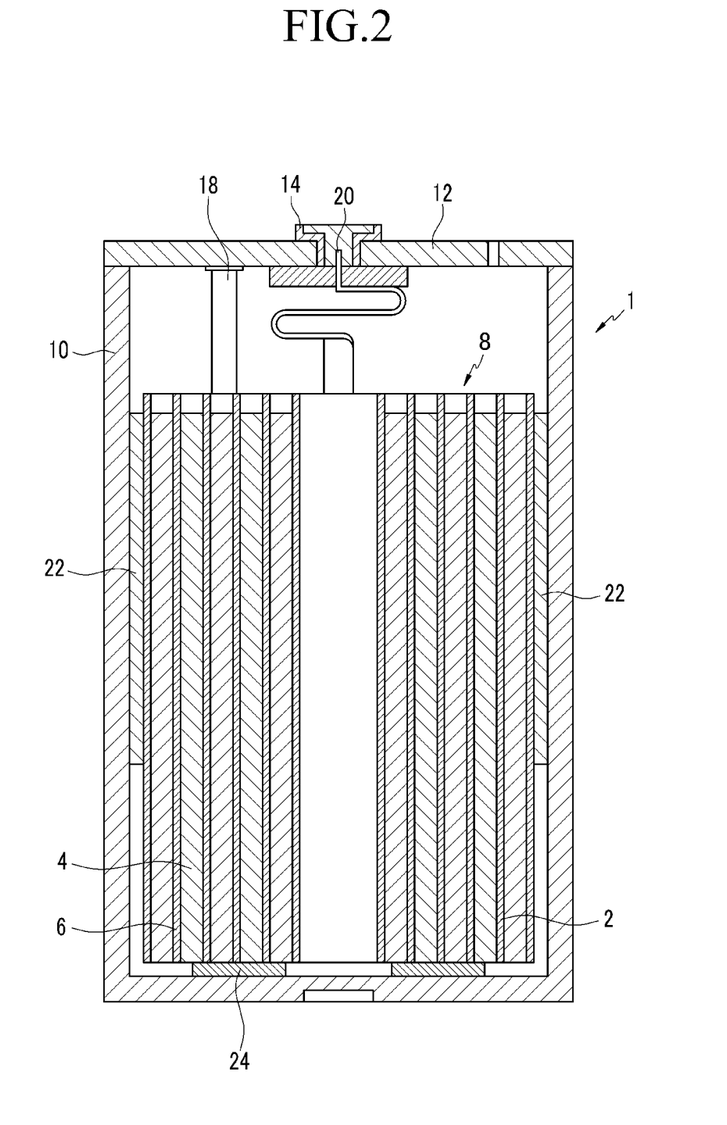
FIG. 2 is a schematic view showing the structure of a lithium secondary battery obtained by using the cathode active material according to one embodiment.

FIG. 2 is a schematic view showing the structure of a lithium secondary battery 1 obtained by using the cathode active material according to one embodiment. Referring to FIG. 2, a separator 6 is interposed between a cathode 2 and an anode 4 and spiral-wound to provide an electrode assembly 8 that is then inserted into a case 10. The upper part of the battery is sealed with a cap plate 12 and a gasket 14. A cathode tab 18 and an anode tab 20 are mounted on the cathode 2 and anode 4, respectively, and insulators 22 and 24 are inserted to prevent an internal short of battery. An electrolyte is injected before sealing the battery, and the injected electrolyte impregnates the cathode 2, the anode 4, and the separator 6.

Although the view shows a prismatic secondary battery, the lithium secondary battery according to the present invention is not limited thereto. It may have any shape such as cylindrical, coin-type, or pouch-type, as long as it may be operated as a battery.

The cathode is fabricated by mixing a cathode active material of the present invention, a conductive material, a binder, and a solvent to prepare a cathode active material composition, then directly coating it on an aluminum current collector and drying it. Alternatively, the cathode active material composition is coated on a separate support and then peeled off from the support. Then, the film is laminated on an aluminum current collector.

The conductive material includes carbon black, graphite, and a metal powder, and the binder includes a vinylidene fluoride/hexafluoropropylene copolymer, polyvinylidene fluoride, polyacrylonitrile, polymethylmethacrylate, polytetrafluoroethylene, and mixtures thereof, but is not limited thereto. The solvent includes N-methylpyrrolidone, acetone, tetrahydrofuran, decane, and the like. Herein, the amounts of the cathode active material, the conductive material, the binder, and the solvent are the same as commonly used in a lithium secondary battery.

Like the cathode, the anode is fabricated by preparing an anode active material composition by mixing an anode active material, a binder, and a solvent, and coating the composition on a copper current collector, or coating it on a separate support, peeling it, and then laminating the film on a copper current collector. Herein, the anode active material composition may further include a conductive material, if necessary.

The anode active material may include materials being capable of intercalating/deintercalating lithium, and it may include, for example, a lithium metal, a metal or an alloy being capable of reacting with lithium, coke, artificial graphite, natural graphite, combusted bodies of organic polymer compounds, carbon fiber, and the like. In addition, the conductive material, the binder, and the solvent may be the same as in the cathode.

The separator materials include polyethylene, polypropylene, and polyvinylidene fluoride, and multi-layers thereof can be used, such as a polyethylene/polypropylene double-layered separator, a polyethylene/polypropylene/polyethylene triple-layered separator, and a polypropylene/polyethylene/polypropylene triple-layered separator.

The electrolyte charged for a lithium secondary battery may include a non-aqueous electrolyte, a solid electrolyte, or the like, in which a lithium salt is dissolved.

The solvent for a non-aqueous electrolyte includes, but is not limited to, cyclic carbonates such as ethylene carbonate, propylene carbonate, butylene carbonate, vinylene carbonate, and the like; linear carbonates such as dimethyl carbonate, methylethyl carbonate, diethylcarbonate, and the like; esters such as methyl acetate, ethyl acetate, propyl acetate, methyl propionate, ethyl propionate, γ-butyrolactone, and the like; ethers such as 1,2-dimethoxyethane, 1,2-diethoxyethane, tetrahydrofuran, 1,2-dioxane, 2-methyltetrahydrofuran, and the like; nitriles such as acetonitrile, and the like; and amides such as dimethyl formamide, and the like. They may be used singularly or in plural. In particular, it may include a mixed solvent of a cyclic carbonate and a linear carbonate.

The electrolyte may include a gel-type polymer electrolyte prepared by impregnating an electrolyte solution in a polymer electrolyte such as polyethylene oxide, polyacrylonitrile, and the like, or an inorganic solid electrolyte such as LiI and $Li_3N$, but is not limited thereto.

The lithium salt includes at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_2$, $LiAlCl_4$, LiCl, and LiI.

MODE FOR INVENTION

The following examples illustrate the present invention in more detail. However, it is understood that the present invention is not limited by these examples.

Example 1

50 g of $TiO_2$ (average particle diameter of 100 nm, manufactured by Cosmo Chemical) was uniformly dispersed in 50 ml of ethanol solution and added with 0.1 g of a $H_3PO_4$ solution and agitated for 10 minutes to provide a coating liquid. The obtained coating liquid was dried at a temperature of 100° C. for 10 hours to provide a powder of which $P_2O_5$ is coated on the surface of $TiO_2$. 0.3 g of powder was added with 100 g of $LiCoO_2$ (average particle diameter of 20 μm) and dry-agitated by a high-speed mixer and fired at a temperature of 1000° C. for 10 hours to provide a cathode active material of a Li—Ti—Co—P—O solid solution.

The obtained cathode active material was dispersed by passing ultrasonic waves therethrough, and then the obtained cathode active material was mixed with Solef 2010 (Belgium) and Super P carbon in a ratio of 95:2.5:2.5 to provide a slurry. The obtained slurry was coated on an aluminum foil to provide an electrode plate. While using the obtained electrode plate as a cathode and the lithium metal as an anode, a coin cell was manufactured and measured for the cycle life characteristic.

Example 2

It was produced in accordance with the same procedure as in Example 1, except that the 0.5 g of powder of which $P_2O_5$ was coated on the surface of $TiO_2$ was used.

Example 3

It was produced in accordance with the same procedure as in Example 1, except that the 1 g of powder of which $P_2O_5$ was coated on the surface of $TiO_2$ was used.

Comparative Example 1

1 g of titanium isopropoxide was added to 50 ml of an ethanol solution and agitated. Then it was produced in accordance with the same procedure as in Example 1, except that 100 g of $LiCoO_2$ (average particle diameter of 20 μm) was added and agitated and dried at a temperature of 100° C. for 5 hours and fired at a temperature of 1000° C. for 10 hours.

Comparative Example 2

It was produced in accordance with the same procedure as in Example 1, except that 100 g of $LiCoO_2$ (average particle diameter of 20 μm) was added to 0.5 g of TiO$_2$ (average particle diameter of 100 nm, manufactured by Cosmo Chemical) and dry-agitated with a high-speed mixer and heated at a temperature of 1000° C. for 10 hours.

Analyzing Structure of Cathode Active Material

Figure 3:
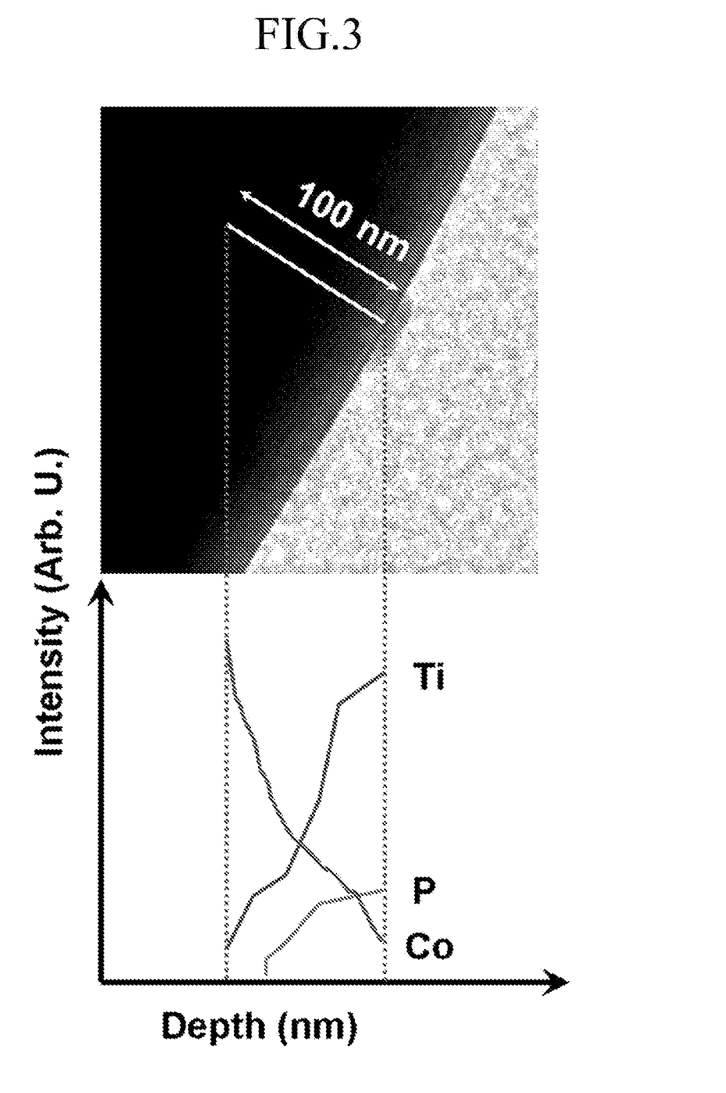
FIG. 3 is a graph analyzing the concentration gradient of Co, Ti, and P in the cathode active material obtained from Example 2, measured using a transmission electron microscope (TEM) and elemental dispersive X-ray (EDX) spectroscopy.

FIG. 3 shows the concentration results of Co, Ti, and P present within a thickness of 100 nm from the surface of the cathode active material, measured by using a component analyzer of elemental dispersive X-ray (EDX) spectroscopy after measuring the cross-section of the cathode active material obtained from Example 2 by using a transmission electron microscope (TEM).

Referring to FIG. 3, it is understood that the concentration of Ti was higher than the concentration of Co in the surface of the cathode active material, and a higher Co concentration was present increasingly further inside the cathode active material. From the results, it is also understood that the cathode active material obtained from Example 2 had a powder structure of which P$_2$O$_5$ coated on the TiO$_2$ surface was uniformly attached to the LiCoO$_2$ surface. In addition, the structure is also confirmed in the cathode active material obtained from Examples 1 and 3.

Figure 4:
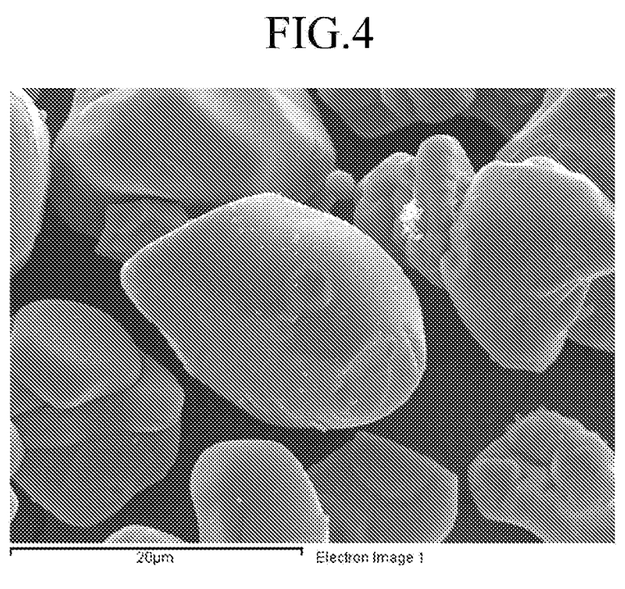
FIG. 4 is a photograph of the surface of cathode active material obtained from Example 2, measured by using a scanning electron microscope (SEM).
Figure 5:
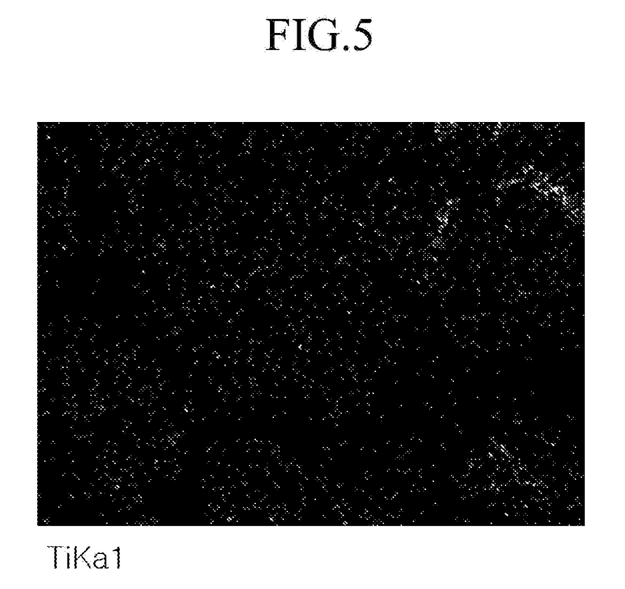
FIG. 5 is a mapping photograph of Ti in the cathode active material obtained from Example 2.
Figure 6:
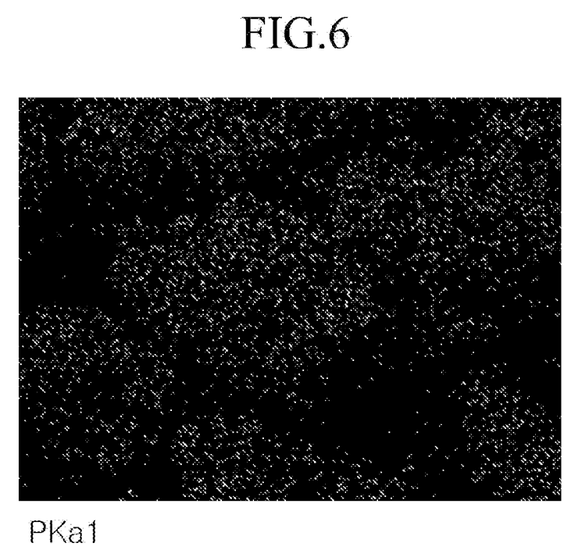
FIG. 6 is a mapping photograph of P in the cathode active material obtained from Example 2.

FIG. 4 is a scanning electron microscope (SEM) photograph of the surface of the cathode active material obtained from Example 2, and FIG. 5 and FIG. 6 are respectively mapping photographs of Ti and P in the cathode active material obtained from Example 2. The mapping photograph is measured by using EDX analysis with a SEM. As shown in FIG. 4, it is confirmed that TiO$_2$ was coated on the surface of the cathode active material, and referring to FIG. 5 and FIG. 6, Ti and P were uniformly dispersed on the surface and inside the cathode active material obtained from Example 2.

Figure 7:
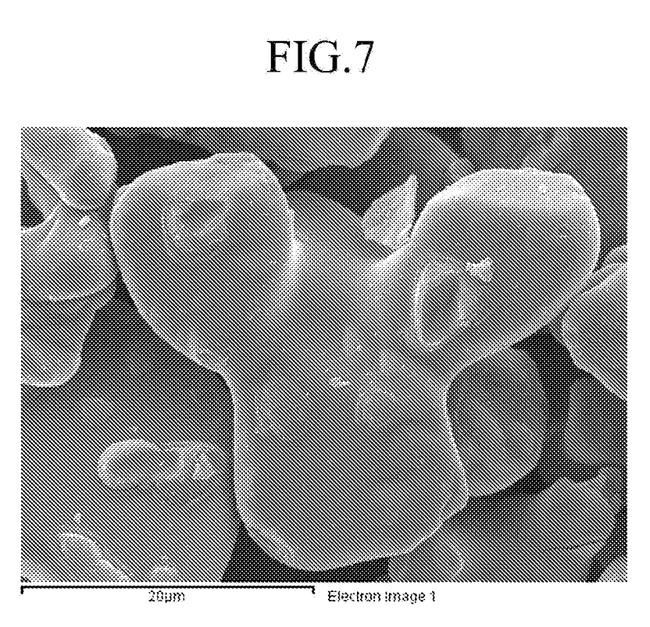
FIG. 7 is a photograph showing the surface of the cathode active material obtained from Example 3, measured using a SEM.
Figure 8:
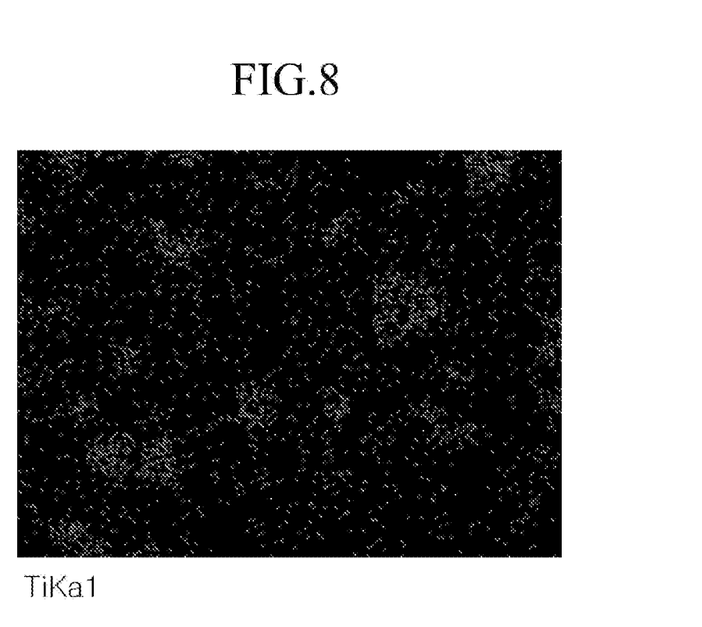
FIG. 8 is a mapping photograph of Ti in the cathode active material obtained from Example 3.
Figure 9:
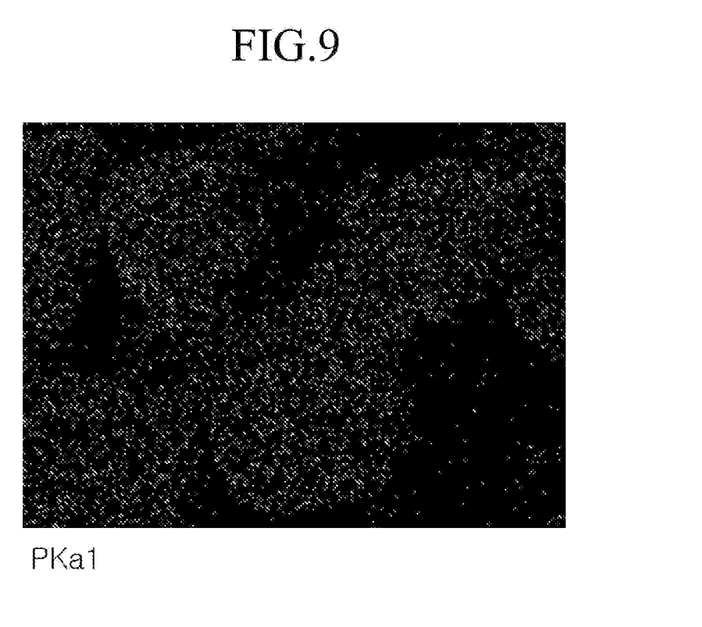
FIG. 9 is a mapping photograph of P in the cathode active material obtained from Example 3.

In addition, FIG. 7 is a SEM photograph of the surface of the cathode active material obtained from Example 3, and FIG. 8 and FIG. 9 are respectively mapping photographs of Ti and P in the cathode active material obtained from Example 3. Referring to FIG. 7, it is confirmed that TiO$_2$ was coated on the surface of the cathode active material, and referring to FIG. 8 and FIG. 9, it is confirmed that Ti and P were uniformly dispersed on the surface and inside of the cathode active material obtained from Example 3.

Figure 10:
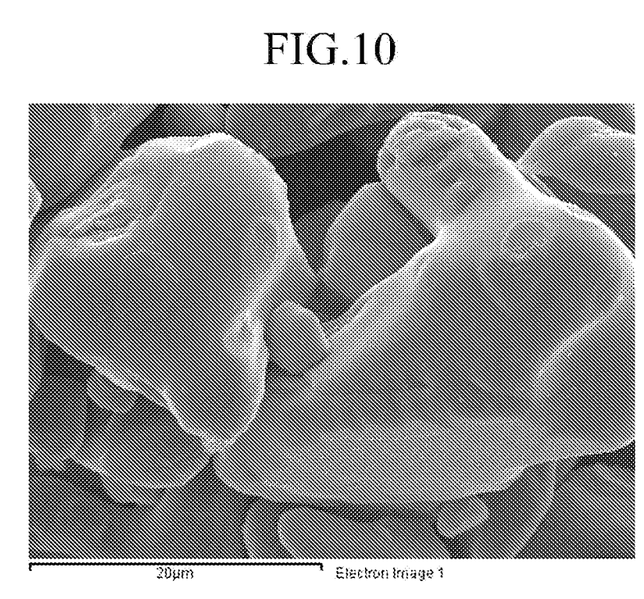
FIG. 10 is a photograph showing the surface of the cathode active material obtained from Comparative Example 1, measured using a SEM.
Figure 11:
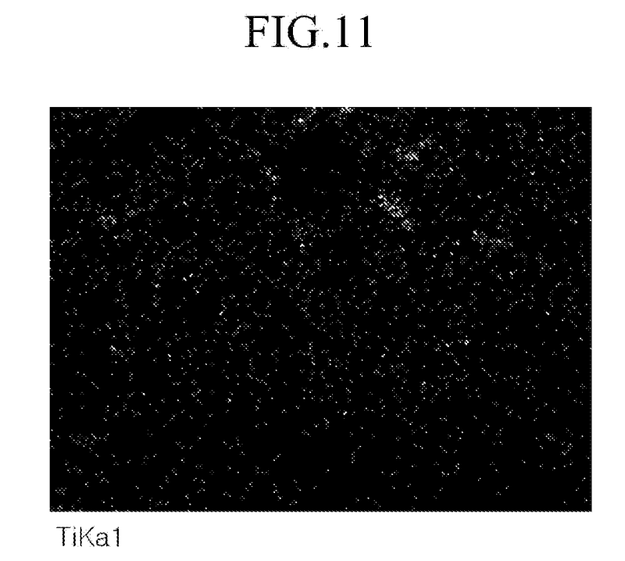
FIG. 11 is a mapping photograph of Ti in the cathode active material obtained from Comparative Example 1.

Furthermore, FIG. 10 is a photograph of the surface of the cathode active material obtained from Comparative Example 1, measured by using a SEM, and FIG. 11 is a mapping photograph of Ti in the cathode active material obtained from Comparative Example 1. Referring to FIG. 10, it is confirmed that TiO$_2$ was coated on the surface of the cathode active material, and referring to FIG. 11, it is confirmed that Ti was uniformly dispersed on the surface and inside the cathode active material obtained from Comparative Example 1, as in Examples 2 and 3.

Battery Characteristics

In order to determine the discharge capacity and the capacity retention of the cathode active material, the following was performed. The coin cells obtained from Examples 1 to 3 and Comparative Examples 1 and 2 were subjected to a charge and discharge test at a temperature of 21° C. and in a voltage ranging from 3.0 to 4.6V by using a charger and discharger, and the discharge capacity results according to C-rate are shown in the following Table 1. In addition, in order to determine the cycle life characteristics of the batteries, they were calculated by dividing the 0.2C-10$^{th}$ discharge capacity by the 0.2C-1$^{st}$ discharge capacity to provide capacity retention. The results are shown in the following Table 1.

TABLE 1

| | 0.1 C discharge capacity (mAh/g) | 1 C-1st discharge capacity (mAh/g) | 2 C discharge capacity (mAh/g) | 2 C-1st discharge capacity (mAh/g) | 2.0 C-10th discharge capacity (mAh/g) | Capacity retention (%) (0.2 C-10th/ 0.2 C-1st) | Process time (hr) |
|---|---|---|---|---|---|---|---|
| Ex. 1 | 190 | 175 | 168 | 181 | 175 | 97 | 20 hours |
| Ex. 2 | 191 | 172 | 164 | 181 | 176 | 97 | 20 hours |
| Ex. 3 | 188 | 174 | 167 | 183 | 180 | 98 | 20 hours |
| Comp. Ex. 1 | 179 | 156 | 149 | 162 | 150 | 93 | 35 hours |
| Comp. Ex. 2 | 186 | 168 | 159 | 174 | 164 | 94 | 16 hours |

As shown in Table 1, the coin cells obtained from Examples 1 to 3 had an initial capacity of 190 mAh/g (Example 1), 191 mAh/g (Example 2), and 188 mAh/g (Example 3) at 0.1C, and 168 mAh/g (Example 1), 164 mAh/g (Example 2), and 167 mAh/g (Example 3) at 2C, in which the discharge capacity was decreased further than at the low rate depending upon increasing the charge and discharge current (C-rate), but they had excellent discharge capacity compared to Comparative Examples 1 and 2. In addition, the coin cells obtained from Examples 1 to 3 had excellent capacity retention even after repeating the charge and discharge 10 times.

Furthermore, it is understood that the process may be completed within 20 hours in Examples 1 to 3, but the wet process was completed within 35 hours in Comparative Example 1.

From the results, the coin cells obtained from Examples 1 to 3 had improved capacity and cycle-life characteristics compared to the coin cells according to Comparative Examples 1 and 2, and remarkably reduced the process cost since it simplified the conventional process.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for preparing a cathode active material for a lithium secondary battery, comprising:
adding a phosphorus compound to a transition metal oxide dispersion liquid to prepare a coating liquid;
drying the coating liquid to prepare a powder including phosphorus oxide coated on the surface of a transition metal oxide; and dry-mixing the powder coated with the phosphorus oxide with a lithium intercalation compound, and firing the mixture to form a solid solution compound of Li-$M_1$-$M_2$-P—O (where $M_1$ is a transition metal derived from transition metal oxide, and $M_2$ is a metal derived from lithium intercalation compound) on the surface of the lithium intercalation compound.

2. The method for preparing a cathode active material for a lithium secondary battery of claim 1, wherein the phosphorus compound is selected from the group consisting of a phosphate, a phosphonate, and a phosphinate, phosphoric acid, and a combination thereof of a cation selected from the group consisting of ammonium, an alkaline metal, and an alkaline-earth metal.

3. The method for preparing a cathode active material for a lithium secondary battery of claim 1, wherein the transition metal oxide has a nano-size.

4. The method for preparing a cathode active material for a lithium secondary battery of claim 3, wherein the transition metal oxide has an average particle diameter of 80 to 900 nm.

5. The method for preparing a cathode active material for a lithium secondary battery of claim 3, wherein the transition metal oxide is added at 0.1 to 2 parts by weight based on 100 parts by weight of the lithium intercalation compound.

6. The method for preparing a cathode active material for a lithium secondary battery of claim 1, wherein the phosphorus compound is added at 0.02 to 10 parts by weight based on 100 parts by weight of the transition metal oxide.

7. The method for preparing a cathode active material for a lithium secondary battery of claim 1, wherein the drying process is performed at a temperature ranging from 80 to 200° C. for 8 to 12 hours.

8. The method for preparing a cathode active material for a lithium secondary battery of claim 1, wherein the lithium intercalation compound has an average particle diameter of 10 to 30 μm.

9. The method for preparing a cathode active material for a lithium secondary battery of claim 1, wherein the phosphorus oxide-coated powder is mixed with the lithium intercalation compound in a weight ratio of 0.02:98.8 to 2:98.

10. The method for preparing a cathode active material for a lithium secondary battery of claim 1, wherein the firing process is performed at a temperature ranging from 700 to 1200° C. for 8 to 12 hours.

* * * * *